United States Patent
Kimes et al.

(10) Patent No.: US 9,109,636 B2
(45) Date of Patent: Aug. 18, 2015

(54) ELECTROMECHANICALLY ACTUATED COUPLING AND CONTROL ASSEMBLY

(75) Inventors: John W. Kimes, Wayne, MI (US);
Patrick J. McCleer, Jackson, MI (US);
Terry O. Hendrick, Cass City, MI (US)

(73) Assignee: Means Industries, Inc., Saginaw, MI (US)

( * ) Notice: Subject to any disclaimer, the term of this patent is extended or adjusted under 35 U.S.C. 154(b) by 86 days.

(21) Appl. No.: 13/992,785

(22) PCT Filed: May 16, 2011

(86) PCT No.: PCT/US2011/036634
§ 371 (c)(1),
(2), (4) Date: Jun. 10, 2013

(87) PCT Pub. No.: WO2012/078202
PCT Pub. Date: Jun. 14, 2012

(65) Prior Publication Data
US 2013/0256078 A1    Oct. 3, 2013

Related U.S. Application Data

(63) Continuation-in-part of application No. 12/211,236, filed on Sep. 16, 2008, now Pat. No. 7,942,781.

(60) Provisional application No. 60/998,773, filed on Oct. 12, 2007, provisional application No. 61/421,856, filed on Dec. 10, 2010.

(51) Int. Cl.
*F16D 27/02* (2006.01)
*F16D 11/14* (2006.01)
(Continued)

(52) U.S. Cl.
CPC .............. *F16D 11/14* (2013.01); *F16D 27/02* (2013.01); *F16D 27/09* (2013.01); *F16D* 
(Continued)

(58) Field of Classification Search
CPC ....... F16D 27/02; F16D 27/108; F16D 27/14; F16D 27/01; F16D 41/08; F16D 41/12; B60K 17/06; B60K 17/08; B60K 1/02; B60K 1/00; B60K 6/00

USPC ....... 192/46, 43.1, 35, 43.2, 41 R, 69, 47, 38, 192/43, 44
See application file for complete search history.

(56) References Cited

U.S. PATENT DOCUMENTS 2,960,287 A    11/1960    Barlow
(Continued)

FOREIGN PATENT DOCUMENTS

GB    1007475 A    10/1965

OTHER PUBLICATIONS

International Search Report and Written opinion; International application No. PCT/US2014/041631; Date of mailing Oct. 9, 2014.
(Continued)

*Primary Examiner* — Ramya Burgess
*Assistant Examiner* — David J Hlavka
(74) *Attorney, Agent, or Firm* — Brooks Kushman P.C.

(57) ABSTRACT

An electromechanically actuated coupling and control assembly is provided. In one embodiment, an overrunning clutch and control assembly having first and second operating modes is provided. The clutch and control assembly includes first and second clutch members supported for rotation relative to one another about a common rotational axis. The first and second clutch members have respective coupling faces that oppose each other. The coupling face of one of the clutch members has a pocket. The coupling face of the other clutch member has a locking formation. The assembly further includes a strut received within the pocket in the coupling face of the one clutch member and has an end that is pivotally movable outwardly of the pocket. The assembly still further includes a biasing spring. The assembly further includes an electromechanical apparatus including an actuator mounted for controlled linear reciprocating motion and in communication with the pocket. The assembly still further includes communication apparatus for wirelessly communicating electrical power from a source of electrical power to the electromechanical apparatus to cause the actuator to linearly move and pivot the strut end against the bias of the spring from a first position which corresponds to the first operating mode to a second position which corresponds to the second operating mode.

40 Claims, 4 Drawing Sheets

(51) Int. Cl.
*F16D 27/09* (2006.01)
*F16D 41/12* (2006.01)
*F16D 48/06* (2006.01)
F16D 27/00 (2006.01)

(52) U.S. Cl.
CPC ..... *41/125* (2013.01); *F16D 48/064* (2013.01); *F16D 2027/005* (2013.01); *F16D 2500/10493* (2013.01)

(56) References Cited

U.S. PATENT DOCUMENTS

| | | | |
|---|---|---|---|
| 3,130,989 A | 4/1964 | Lannen | |
| 4,050,560 A * | 9/1977 | Torstenfelt | 192/85.02 |
| 4,340,133 A * | 7/1982 | Blersch | 192/30 W |
| 5,052,534 A | 10/1991 | Gustin et al. | |
| 5,070,978 A | 12/1991 | Pires | |
| 5,206,573 A | 4/1993 | McCleer et al. | |
| 5,231,265 A | 7/1993 | Hackett et al. | |
| 5,362,293 A | 11/1994 | Romanauskas | |
| 5,387,854 A | 2/1995 | McCleer et al. | |
| 5,394,321 A | 2/1995 | McCleer et al. | |
| 5,449,057 A | 9/1995 | Frank | |
| 5,453,598 A | 9/1995 | Hackett et al. | |
| 5,597,057 A | 1/1997 | Ruth et al. | |
| 5,638,929 A | 6/1997 | Park | |
| 5,642,009 A | 6/1997 | McCleer et al. | |
| 5,678,668 A | 10/1997 | Sink | |
| 5,806,643 A | 9/1998 | Fitz | |
| 5,847,469 A | 12/1998 | Tabata et al. | |
| 5,856,709 A | 1/1999 | Ibaraki et al. | |
| 5,871,071 A | 2/1999 | Sink | |
| 5,918,715 A | 7/1999 | Ruth et al. | |
| 5,927,455 A | 7/1999 | Baker et al. | |
| 5,954,174 A | 9/1999 | Costin | |
| 5,964,331 A | 10/1999 | Reed et al. | |
| 5,979,627 A | 11/1999 | Ruth et al. | |
| 6,019,699 A | 2/2000 | Hoshiya et al. | |
| 6,065,576 A | 5/2000 | Shaw et al. | |
| 6,075,302 A | 6/2000 | McCleer | |
| 6,116,394 A | 9/2000 | Ruth | |
| 6,125,980 A | 10/2000 | Ruth et al. | |
| 6,129,190 A | 10/2000 | Reed et al. | |
| 6,186,299 B1 | 2/2001 | Ruth | |
| 6,193,038 B1 | 2/2001 | Scott et al. | |
| 6,237,931 B1 | 5/2001 | Marola | |
| 6,244,965 B1 * | 6/2001 | Klecker et al. | 464/81 |
| 6,290,044 B1 | 9/2001 | Burgman et al. | |
| 6,306,057 B1 | 10/2001 | Morisawa et al. | |
| 6,344,008 B1 | 2/2002 | Nagano et al. | |
| 6,386,349 B1 | 5/2002 | Welch | |
| 6,481,551 B1 | 11/2002 | Ruth | |
| 6,503,167 B1 | 1/2003 | Sturm | |
| 6,505,721 B1 | 1/2003 | Welch | |
| 6,571,926 B2 | 6/2003 | Pawley | |
| 6,814,201 B2 | 11/2004 | Thomas | |
| 6,846,257 B2 | 1/2005 | Baker et al. | |
| 6,854,577 B2 | 2/2005 | Ruth | |
| 6,953,409 B2 | 10/2005 | Schmidt et al. | |
| 6,982,502 B1 | 1/2006 | Sendaula et al. | |
| 7,025,188 B2 | 4/2006 | Lindenschmidt et al. | |
| 7,093,512 B2 | 8/2006 | Ibamoto et al. | |
| 7,100,756 B2 | 9/2006 | Kimes et al. | |
| 7,153,228 B2 | 12/2006 | Fujiu et al. | |
| 7,198,587 B2 | 4/2007 | Samie et al. | |
| 7,201,690 B2 | 4/2007 | Miura et al. | |
| 7,223,198 B2 | 5/2007 | Kimes et al. | |
| 7,223,200 B2 | 5/2007 | Kojima et al. | |
| 7,255,186 B2 | 8/2007 | Wakuta et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,349,010 B2 | 3/2008 | Bryant et al. | |
| 7,383,930 B2 | 6/2008 | Kimes et al. | |
| 7,393,296 B2 | 7/2008 | Kano et al. | |
| 7,397,296 B1 | 7/2008 | Kiani | |
| 7,426,971 B2 | 9/2008 | Kano et al. | |
| 7,448,481 B2 | 11/2008 | Kimes et al. | |
| 7,451,862 B2 | 11/2008 | Kimes et al. | |
| 7,455,156 B2 | 11/2008 | Kimes et al. | |
| 7,455,157 B2 | 11/2008 | Kimes et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,614,466 B2 | 11/2009 | Kano et al. | |
| 7,621,359 B2 | 11/2009 | Kano et al. | |
| 7,661,518 B2 | 2/2010 | Kimes | |
| 7,690,455 B2 | 4/2010 | Kano et al. | |
| 7,690,492 B2 | 4/2010 | Gooden et al. | |
| 7,806,795 B2 | 10/2010 | Oba et al. | |
| 7,942,781 B2 | 5/2011 | Kimes | |
| 8,007,396 B2 | 8/2011 | Kimes et al. | |
| 8,051,959 B2 | 11/2011 | Eisengruber | |
| 8,061,796 B2 * | 11/2011 | Walmsley et al. | 347/13 |
| 8,079,453 B2 | 12/2011 | Kimes | |
| 8,187,141 B2 | 5/2012 | Goleski et al. | |
| 8,196,724 B2 * | 6/2012 | Samie et al. | 192/43.1 |
| 8,272,488 B2 | 9/2012 | Eisengruber et al. | |
| 8,286,772 B2 | 10/2012 | Eisengruber | |
| 8,324,890 B2 | 12/2012 | Lin | |
| 8,491,439 B2 | 7/2013 | Kimes | |
| 8,491,440 B2 | 7/2013 | Kimes et al. | |
| 8,720,659 B2 * | 5/2014 | Pawley | 192/46 |
| 2002/0000724 A1 | 1/2002 | Kalargeros et al. | |
| 2004/0159517 A1 * | 8/2004 | Thomas | 192/39 |
| 2006/0021838 A1 | 2/2006 | Kimes et al. | |
| 2006/0138777 A1 | 6/2006 | Hofbauer et al. | |
| 2006/0185957 A1 * | 8/2006 | Kimes et al. | 192/46 |
| 2007/0056825 A1 | 3/2007 | Fetting et al. | |
| 2007/0107960 A1 | 5/2007 | Takami et al. | |
| 2007/0278061 A1 | 12/2007 | Wittkopp et al. | |
| 2008/0093190 A1 | 4/2008 | Belmont | |
| 2008/0110715 A1 | 5/2008 | Pawley | |
| 2008/0135369 A1 | 6/2008 | Meier | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0188338 A1 | 8/2008 | Kimes et al. | |
| 2008/0223681 A1 | 9/2008 | Stevenson et al. | |
| 2008/0245360 A1 | 10/2008 | Almy et al. | |
| 2009/0062058 A1 | 3/2009 | Kimes et al. | |
| 2009/0084653 A1 | 4/2009 | Holmes | |
| 2009/0098970 A1 | 4/2009 | Kimes | |
| 2009/0127059 A1 | 5/2009 | Knoblauch | |
| 2009/0133981 A1 | 5/2009 | Tarasinski et al. | |
| 2009/0142207 A1 | 6/2009 | Ring et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |
| 2009/0233755 A1 | 9/2009 | Kimes | |
| 2009/0255773 A1 | 10/2009 | Seufert et al. | |
| 2010/0071497 A1 * | 3/2010 | Reisch et al. | 74/473.12 |
| 2010/0105515 A1 | 4/2010 | Goleski et al. | |
| 2010/0127693 A1 | 5/2010 | Wenzel et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2012/0021862 A1 | 1/2012 | Isken, II et al. | |
| 2012/0145505 A1 | 6/2012 | Kimes | |
| 2012/0149518 A1 | 6/2012 | Kimes | |
| 2012/0152683 A1 | 6/2012 | Kimes | |
| 2012/0152687 A1 | 6/2012 | Kimes et al. | |
| 2012/0228076 A1 | 9/2012 | Tate, Jr. et al. | |
| 2013/0062151 A1 | 3/2013 | Pawley | |

OTHER PUBLICATIONS

International Search Report and Written Opinion; International application No. PCT/US2011/036634; date of mailing Aug. 25, 2011.

International Preliminary Report on Patentability; International application No. PCT/US2011/036634; date of issuance of report Jun. 12, 2013.

(56) References Cited

OTHER PUBLICATIONS

International Search Report and Written Opinion; International Application No. PCT/US12/050742; date of mailing Nov. 20, 2012.
Office Action, corresponding U.S. Appl. No. 14/288,819; date of mailing Jan. 12, 2015.

International Search Report and Written Opinion; International application No. PCT/US2014/049044; date of mailing Nov. 24, 2014.

* cited by examiner

ELECTROMECHANICALLY ACTUATED COUPLING AND CONTROL ASSEMBLY

CROSS-REFERENCE TO RELATED APPLICATIONS

This application claims the benefit of provisional patent application entitled "Method And System For Controlling A Coupling Or Clutch Assembly And Electromechanical Actuator Subassembly For Use Therewith" filed Dec. 10, 2010 and having Ser. No. 61/421,856. This application is a continuation-in-part application of U.S. patent application entitled "High-Efficiency Vehicular Transmission" filed Sep. 6, 2008 and having Ser. No. 12/211,236 which, in turn, claims the benefit of provisional application No. 60/998,773 filed on Oct. 12, 2007.

TECHNICAL FIELD

This invention relates to coupling and control assemblies. This invention also relates to clutch and control assemblies and, in particular, to such assemblies which are electromechanically actuated for use in vehicular automatic transmissions.

OVERVIEW

A one-way clutch (i.e., OWC) produces a drive connection (locked state) between rotating components when their relative rotation is in one direction, and overruns (freewheel state) when relative rotation is in the opposite direction. A typical one-way clutch consists of an inner ring, an outer ring and a locking device between the two rings. Two types of one-way clutches often used in vehicular, automatic transmissions include:
  Roller type which consists of spring loaded rollers between the inner and outer race of the one-way clutch. (Roller type is also used without springs on some applications); and
  Sprag type which consists of asymmetrically shaped wedges located between the inner and outer race of the one-way clutch.

The one-way clutches are typically used in the transmission to prevent an interruption of drive torque (i.e., power flow) during certain gear shifts and to prevent engine braking during coasting. Also, there is a one-way clutch in the stator of the torque converter.

A controllable OWC is an OWC where the lock action can be turned "off" such that it freewheels in both directions, and/or the lock action can be turned "on" such that it locks in one or both directions.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2010/0252384; 2010/0230226; 2010/0200358; 2009/0255773; 2009/0211863; 2009/0194381; 2009/0159391; 2009/0142207; 2009/0133981; 2009/0127059; 2009/0098970; 2009/0084653; 2008/0223681; 2008/0110715; 2008/0169166; 2008/0169165; 2008/0185253; 20008/0135369; 2007/0278061; 2007/0056825; 2006/0138777; 2006/0185957; and the following U.S. Pat. Nos. 7,806,795; 7,491,151; 7,464,801; 7,349,010; 7,275,628; 7,256,510; 7,223,198; 7,198,587; 7,153,228; 7,093,512; 6,982,502; 6,953,409; 6,846,257; 6,814,201; 6,503,167; 6,193,038; 6,075,302; 4,050,560; 5,052,534; 5,387,854; 5,231,265; 5,394,321; 5,206,573; 5,453,598; 5,642,009; 5,638,929; 5,362,293; 5,678,668; and 5,918,715.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF EXAMPLE EMBODIMENTS

In one embodiment, an overrunning clutch and control assembly having first and second operating modes is provided. The assembly includes first and second clutch members supported for rotation relative to one another about a common rotational axis. The first and second clutch members have respective coupling faces that oppose each other. The coupling face of one of the clutch members has a pocket. The coupling face of the other clutch member has a locking formation. The assembly further includes a strut received within the pocket in the coupling face of the one clutch member and has an end that is pivotally movable outwardly of the pocket. The assembly still further includes a biasing spring. The assembly further includes an electromechanical apparatus including an actuator mounted for controlled linear reciprocating motion and move in communication with the pocket. The assembly still further includes communication apparatus for wirelessly communicating electrical power from a source of electrical power to the electromechanical apparatus to cause the actuator to linearly move and pivot the strut end against the bias of the spring from a first position which corresponds to the first operating mode to a second position which corresponds to the second operating mode.

The coupling face of the one of the clutch members may be oriented to face axially in a first direction along the rotational axis and the coupling face of the other clutch member may be oriented to face axially in a second direction along the rotational axis.

The biasing spring may bias the strut against pivotal movement of the strut end out of the pocket toward the locking formation of the coupling face of the other clutch member.

The electromechanical apparatus may include a latching solenoid.

The biasing spring may bias the actuator against linear movement towards the locking formation. The strut may be pivotally connected to the actuator.

The first position may be an overrun position. The first operating mode may be an overrun mode. The second position may be a locked position. The second operating mode may be a locked mode.

The assembly may include a sensor for sensing the position of the strut end and providing corresponding feedback information.

In another embodiment, an overrunning clutch and control assembly having first and second operating modes is provided. The assembly includes first and second clutch members supported for rotation relative to one another about a common rotational axis. The first and second clutch members have respective coupling faces that oppose each other. The coupling face of one of the clutch members has first and second pockets. The coupling face of the other clutch member has at least one locking formation. The assembly further includes a first strut received within the first pocket and a second strut received within the second pocket in the coupling face of the one clutch member. Each of the struts has an end that is pivotally movable outward of its respective pocket. The assembly still further includes a first and second biasing springs. The assembly further includes first and second electromechanical apparatus. The first electromechanical apparatus includes a first actuator mounted for controlled linear reciprocating motion and in communication with the first pocket. The second electromechanical apparatus includes a second actuator mounted for controlled linear reciprocating motion and in communication with the second pocket. The assembly still further includes control logic to control the first and second electromechanical apparatus in accordance with a control algorithm. The assembly further includes communication apparatus for wirelessly communicating electrical power from a source of electrical power to one of the first and second electromechanical apparatus selected by the control logic to cause the actuator of the selected electromechanical apparatus to linearly move and pivot a corresponding strut end against the bias of the corresponding biasing spring from a first position which corresponds to the first operating mode to a second position which corresponds to the second operating mode.

The coupling face of the one of the clutch members may be oriented to face axially in a first direction along an axis and the coupling face of the other clutch member may be oriented to face axially in a second direction along the axis.

Each of the electromechanical apparatus may include a latching solenoid.

The first position may be an overrun position. The first operating mode may be an overrun mode. The second position may be a locked position. The second operating mode may be a locked mode.

The corresponding biasing spring may bias the pivoted strut against pivotal movement of its end out of its pocket toward the locking formation of the coupling face of the other clutch member.

The actuator of the selected electromechanical apparatus may be biased by the corresponding biasing spring against linear movement towards the locking formation. The actuator of the selected electromechanical apparatus may be pivotally connected to its respective strut.

The assembly may include a first sensor for sensing the position of the first strut end and providing corresponding feedback information and a second sensor for sensing the position of second strut end and providing corresponding feedback information for controlling the first and second electromechanical apparatus, respectively.

In yet another embodiment, a coupling and control assembly having first and second operating modes is provided. The assembly includes a first coupling member having a pocket. The assembly further includes a second coupling member having a locking formation. The assembly still further includes an engaging member received in the pocket. The engaging member may be engageable with the locking formation. The assembly further includes an electromechanical apparatus having an actuator mounted for controlled linear reciprocating motion and in communication with the pocket. The assembly still further includes communication apparatus for wirelessly communicating electrical power from a source of electrical power to the electromechanical apparatus to cause the actuator to linearly move and move the engaging member from a first position which corresponds to the first operating mode to a second position which corresponds to the second operating mode.

The coupling face of the one of the clutch members may be oriented to face axially in a first direction along an axis and the coupling face of the other clutch member may be oriented to face axially in a second direction along the axis.

The electromechanical apparatus may include a latching solenoid.

The first position may be an overrun position. The first operating mode may be an overrun mode. The second position may be a locked position. The second operating mode may be a locked mode.

The engaging member may be pivotally connected to the actuator.

The assembly may include a sensor for sensing the position of the engaging member and providing corresponding feedback information.

In still yet another embodiment, a coupling and control assembly having first and second operating modes is provided. The assembly includes a first coupling member having first and second pockets. The assembly further includes a second coupling member having at least one locking formation. The assembly still further includes a first engaging member received in the first pocket and a second engaging member received within the second pocket. The engaging members may be engageable with the at least one locking formation. The assembly further includes first and second electromechanical apparatus. The first electromechanical apparatus includes a first actuator mounted for controlled linear reciprocating motion and in communication with the first pocket. The second electromechanical apparatus includes a second actuator mounted for controlled linear reciprocating motion and in communication with the second pocket. The assembly still further includes control logic to control the first and second electromechanical apparatus in accordance with a control algorithm. The assembly further includes communication apparatus for wirelessly communicating electrical power from a source of electrical power to one of first and second electromechanical apparatus selected by the control logic to cause the actuator of the selected electromechanical apparatus to linearly move and move a corresponding engaging member from a first position which corresponds to the first operating mode to a second position which corresponds to the second operating mode.

The coupling face of the one of the clutch members may be oriented to face axially in a first direction along an axis and the coupling face of the other clutch member may be oriented to face axially in a second direction along the axis.

Each of the electromechanical apparatus may include a latching solenoid.

The actuator of the selected electromechanical apparatus may be pivotally connected to its respective engaging member.

The first position may be an overrun position. The first operating mode may be an overrun mode. The second position may be a locked position. The second operating mode may be a locked mode.

The assembly may include a first sensor for sensing the position of the first engaging member and providing feedback information and a second sensor for sensing the position of the second engaging member and providing feedback information for controlling the first and second electromechanical apparatus, respectively.

In yet another embodiment, a clutch and control assembly having first and second operating modes is provided. The assembly includes first and second clutch members that are rotatably supported for rotation relative to one another about a common rotational axis. The first and second clutch members have respective coupling faces that oppose each other. The coupling face of one of the clutch members has a pocket. The coupling face of the other clutch member has a locking formation. The assembly further includes a strut received within the pocket of the coupling face of the one clutch member and has an engaging portion that is movable away from the pocket. The assembly still further includes an electromechanical apparatus including an actuator mounted for controlled linear reciprocating motion and in communication with the pocket. The assembly further includes communication apparatus for wirelessly communicating electrical power from a source of electrical power to the electromechanical apparatus to cause the actuator to linearly move and move the engaging portion of the strut from a first position which corresponds to the first operating mode to a second position which corresponds to the second operating mode.

The coupling face of the one of the clutch members may be oriented to face axially in a first direction along the rotational axis and the coupling face of the other clutch member may be oriented to face axially in a second direction along the rotational axis.

The electromechanical apparatus may include a latching solenoid.

The strut may be pivotally connected to the actuator.

The first position may be an overrun position. The first operating mode may be an overrun mode. The second position may be a locked position. The second operating mode may be a locked mode.

The assembly may include a sensor for sensing the position of the engaging portion of the strut and providing corresponding feedback information.

In still yet another embodiment, a clutch and control assembly having first and second operating modes is provided. The assembly includes first and second clutch members that are rotatably supported for rotation relative to one another about a common rotational axis. The first and second clutch members have respective coupling faces that oppose each other. The coupling face of one of the clutch members has forward and reverse pockets. The coupling face of the other clutch member has at least one locking formation. The assembly further includes a forward strut received within the forward pocket and a reverse strut received within the reverse pocket of the coupling face of the one clutch member. Each of the struts has an engaging portion that is movable away from its respective pocket. The assembly still further includes forward and reverse electromechanical apparatus. The forward electromechanical apparatus includes a forward actuator mounted for controlled linear reciprocating motion and in communication with the forward pocket. The reverse electromechanical apparatus includes a reverse actuator mounted for controlled linear reciprocating motion and in communication with the reverse pocket. The assembly further includes control logic to control the forward and reverse electromechanical apparatus in accordance with a control algorithm. The assembly still further includes communication apparatus for wirelessly communicating electrical power from a source of electrical power to one of the forward and reverse electromechanical apparatus selected by the control logic to cause the actuator of the selected electromechanical apparatus to linear move and move a corresponding engaging portion from a first position which corresponds to the first operating mode to a second position which corresponds to the second operating mode.

The actuator of the selected electromechanical apparatus may be pivotally connected to its respective strut.

The coupling face of the one of the clutch members may be oriented to face axially in a first direction along the rotational axis and the coupling face of the other clutch member may be oriented to face axially in a second direction along the rotational axis.

Each of the electromechanical apparatus may include a latching solenoid.

The first position may be an overrun position. The first operating mode may be an overrun mode. The second position may be a locked position and the second operating mode may be a locked mode.

The assembly may include a forward sensor for sensing the position of the engaging portion of the forward strut and providing corresponding feedback information and a reverse sensor for sensing the position of the engaging portion of the reverse strut and providing corresponding feedback information for controlling the forward and reverse electromechanical apparatus, respectively.

Objects, features, and advantages of the present invention are readily apparent from the following detailed description of the best mode for carrying out the invention when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
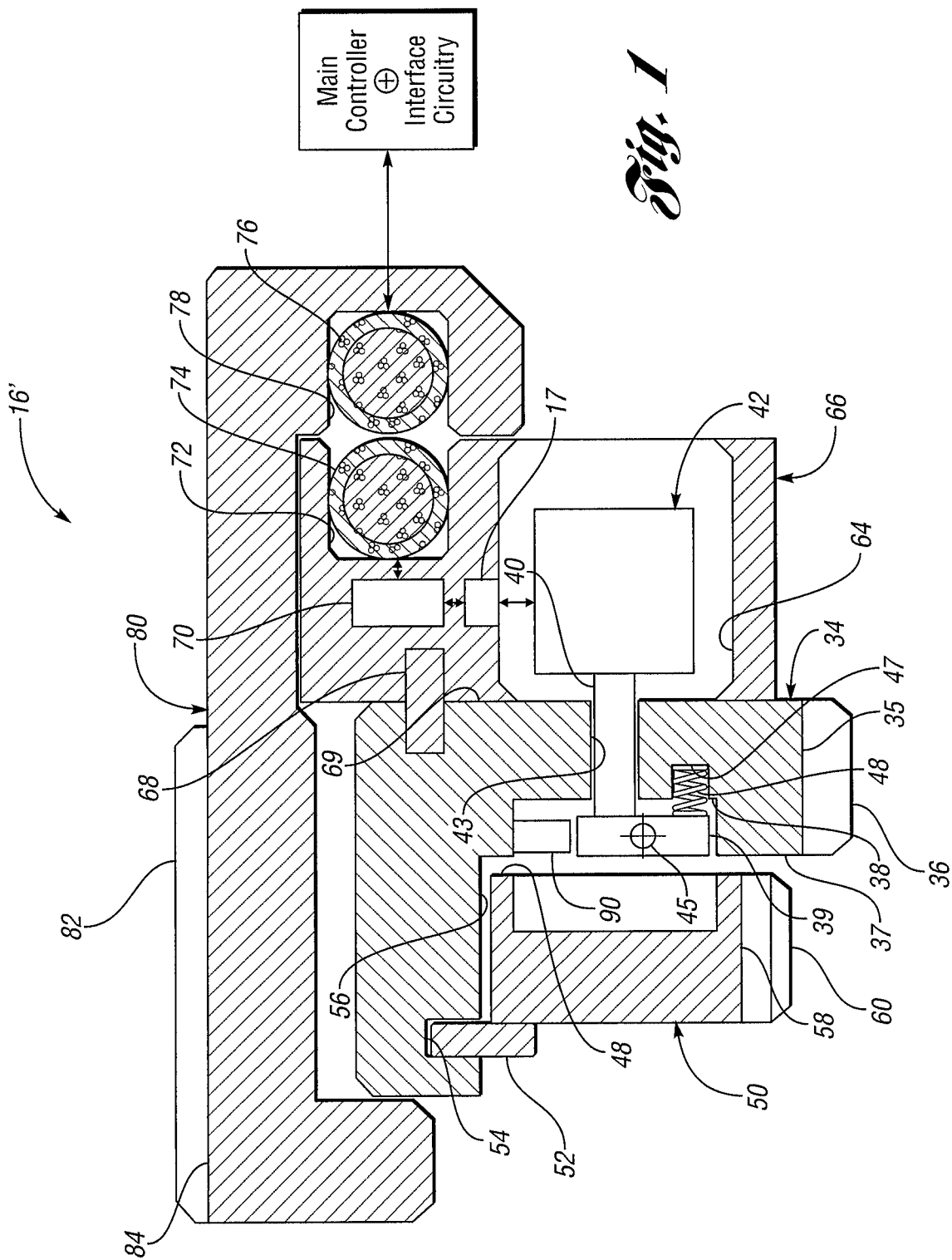
FIG. 1 is a side schematic, sectional view of a dynamic selectable or controllable clutch assembly with an "on-board" solenoid controller or subsystem constructed in accordance with at least one embodiment of the present invention.

Referring to FIG. 1, a main controller typically includes motor and engine (i.e., IC Engine or gas motor) controls or control logic which, in turn, performs a number of control functions including a transmission control algorithm. The main controller directly controls a solenoid controller 17 which is "onboard" a clutch or coupling assembly 16'. The solenoid controller 17 controls the coupling assembly 16' in response to a control signal from the main controller. Control algorithms for the clutch 16' are portions of an overall transmission control algorithm.

FIG. 1 is a side schematic, sectional view of the dynamic selectable or controllable clutch 16' with "on-board" solenoid controller or system constructed in accordance with at least one embodiment of the present invention. Such dynamic clutches are generally of the type shown in U.S. patent publication 2010/0252384.

Figure 3:
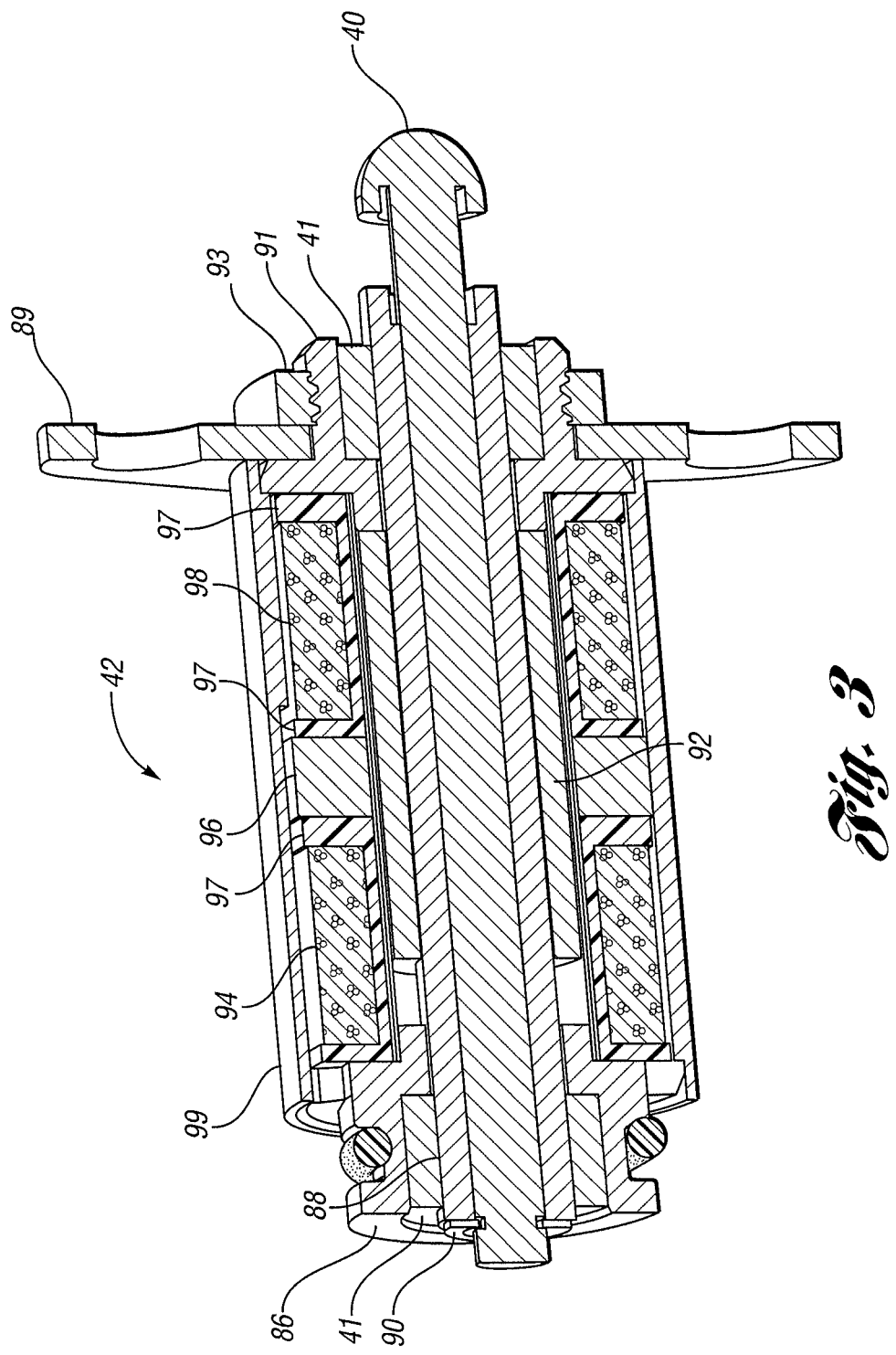
FIG. 3 is a sectional perspective view of a latching solenoid for use in the embodiment of FIG. 1.

The assembly 16' includes an annular pocket member or plate, generally indicated at 34. An inner axially-extending surface 35 of the plate 34 has internal splines 36 for engagement with a torque transmitting element of a vehicular transmission. An inner, radially-extending face or surface 37 of the plate 34 is formed with spaced reverse pockets 38 in which reverse struts 39 are received and retained to pivot therein about a pivot 45. One end portion of each reverse strut 39 is normally biased outwardly by a coil spring 48 disposed with an aperture 47 of the pocket 38. The opposite end portion of each reverse strut 39 is controlled by an actuator in the form of a central domed plunger or push pin 40 of a magnetically latching solenoid, generally indicated at 42. As indicated in FIG. 3, the latching solenoid 42 is mounted to the plate 34 within the cavity 64 by a mounting flange 89 which is held on an end housing member 91 by a locking collar 93. A second end housing member 86 closes the opposite end of solenoid 42 and may include an O-ring for sealing purposes. The solenoid 42 also includes an exterior housing member 99.

The push pin 40 (which is shown in its fully extended position in FIG. 3) together with an armature 92 of the solenoid 42 reciprocate together within the solenoid 42 so that the pin 40 reciprocates, within a passage 43 of the plate 34. The push pin 40 is supported for reciprocating motion by a Teflon-coated cylindrical member 88. A locking ring 90 moves with the pin 40. The member 88 is supported at its opposite ends of the solenoid 42 by members 41. The armature 92 is positioned adjacent an upper coil assembly 94, a permanent magnet 96 and a lower coil assembly 98. The coil assemblies 94 and 98 include coils embedded within a suitable resin 97. Springs (not shown) preferably bias the pin 40 between its extended and retracted positions. For example, one spring may be located between the ring 90 and one end of the member 88 and a second spring may be located between the other end of the member 88 and the inner surface of the dome of the pin 40.

The passage 43 communicates the cavity 64 of a frame rail, generally included at 66, in which the solenoid 42 is housed with the pocket 38 to actuate the opposite end portion of its reverse strut and overcome the bias of its spring. Preferably, at least two reverse struts 39 are provided. One latching solenoid (such as latching solenoid 42) is provided for each reverse strut. However, it is to be understood that a greater or lesser member of reverse struts 39 and corresponding latching solenoids 42 may be provided to control the operating mode or state of the clutch 16'.

The face or radial surface 37 of the pocket plate 34 is also formed with spaced forward pockets (now shown) in which forward struts (not shown) are received and retained to pivot therein. Like the reverse struts 39, one end portion of each forward strut is normally biased outwardly by a coil spring (not shown) disposed within an aperture (not shown) of the plate 34. Each opposite end portion of the forward struts are controllably actuated or moved by an actuating end portion or part of an armature of a forward, magnetically latching solenoid (not shown but substantially the same in function and structure as the reverse magnetically latching solenoid 42). The armature of each forward magnetically latching solenoid reciprocates within a passage which communicates its pocket with the cavity in which its solenoid is housed to overcome the bias of its coil spring. Preferably, two forward struts are provided. However, it is to be understood that a greater or lesser number of forward struts may be provided with a forward, magnetically latching solenoid for each forward strut to control the operating state or mode of the clutch 16. Also, it is to be understood that the end portion or part of each armature may support different types of strut actuators such as pins or springs to move therewith.

As shown in U.S. patent publication No. 2010/0252384 (but not shown in FIG. 1, but shown at 208 in FIG. 4), the assembly 16' may also include a middle plate or element, having a plurality of spaced apertures extending completely therethrough to allow the reverse struts and the forward struts to pivot in their pockets and extend through their corresponding apertures to engage spaced locking formations or notches formed in a radially extending face or surface 48 of a notch plate, generally indicated at 50. The forward and/or reverse struts engage the locking formations during linear movement of the push pin 40 towards the plate 50. The forward and/or reverse struts disengage the locking formations during linear movement of the push pin 40 away from the plate 50 under the biasing action of the corresponding forward and/or reverse coil springs.

A snap ring 52 is disposed within a groove 54 formed in an axial surface 56 of the plate 34 to retain the notch plate 50 with the pocket plate 34. The ring 52 holds the plates 50, 34 and the middle plate (not shown) together and limit axial movement of the plates relative to one another. An inner axially extending surface 58 of the plate 50 has internal splines 60 for engagement with a torque transmitting element of the transmission 10'.

The forward struts lock the notch plate 50 to the pocket plate 34 in one direction of relative rotational movement about an axis but allow free-wheeling in the opposite direction about the axis. The reverse struts perform the same locking function in the opposite direction.

Each solenoid 42 is disposed in its cavity 64 formed in the frame rail 66. In turn, the frame rail 66 is press fit via dowel pins 68 into the back side or surface 69 of the pocket plate 34 so that the frame rail 66 rotates with the plate 34. The frame rail 66 houses the solenoid controller 17 and associated electronics 70 for the solenoids within the frame rail 66. In general, the solenoid controller 17 bi-directionally communicates data from and to the main controller via an interface circuit including rotating and static transformer inductors or coils 74 and 76, respectively. The coils 74 and 76 also help communicates or couples power from a power source to the latching solenoids.

The frame rail 66 has a second cavity 72 in which the rotating transformer coil 74 is housed to rotate therewith. The coils 74 are electromagnetically coupled to the static coils 76 which are housed in a third cavity 78 formed in an aluminum housing 80. The housing 80 is grounded or fixed to the transmission housing by splines 82 formed on an axially extending exterior surface 84 of the housing 80. The main controller sends both modulated and unmodulated power signals to the static coils 76 which, in turn, induces corresponding signals in the rotating coils 74 across the gap between the rotating frame rail 66 and the fixed housing 80.

The solenoid controller 17 converts the AC power signals to DC power signals downstream of the rotating coils 74 to induce current in selected ones of the solenoids 42 under control of the controller 17. The controller 17 and associated electronics 70 split the signals and directs the signals to separately control the brake side and drive side of the OWC 16' (independent control and actuation of the reverse and forward struts via the latching solenoids 42). The controller 17 and the electronics 70 also act as a communication bus for the control data or signals to and from the main controller and the rotating clutch 16'. Examples of what are communicated are:

Send a signal to the main controller verifying "OFF" and "ON" positions (feedback signal) generated from a position sensor or transducer 90 disposed within the pocket plate 34 adjacent the strut 39 within or immediately adjacent the pocket 38. The position sensor 90 may include an electromagnetic coil or inductor embedded within or surrounded by a suitable resin and disposed within a coil housing. The resulting sensor 90 is disposed within a cavity formed in the plate 34 or in the pocket 38 in which the strut 39 is located. The coil is energized by a DC voltage by the microprocessor to generate a magnetic flux which, as long as the strut 39 is in the pocket 38, flows through the coil housing, through a portion of the strut 39 and across the small air gaps between the coil housing and the strut 39. When the strut 39 pivots out of the pocket 38, the magnetic flux is broken which condition is sensed by the microprocessor. In this way, the states or positions of the struts 39 are monitored by the microprocessor.

The OWC 16' goes "OFF" when there is a loss of power in the system. A signal is sent to the clutch 16' saying power is "ON". If that signal fails, one or more capacitors (which are typically maintained charged) in the electronics 70 fire into the coils 94 and/or 98 of the solenoids 42 and latch the solenoids 42 in their "OFF" position.

The control system has the capability to communicate control data and feedback signals using the same circuit (i.e., the controller 17 and the electronics 70) by which power is delivered to the solenoids 42 (i.e., the frame rail 66 may be modified to add sensors/the electronics 70/the controller 17).

The solenoid controller 17 may comprise a programmed microprocessor to control initialization and strut actuation, preferably by directly or indirectly controlling current supplied to the solenoids 42 in the form of pulses which function as drive signals for the solenoids.

The various components or functions of controller 17 may be implemented by a separate controller as illustrated, or may be integrated or incorporated into the vehicular transmission or the main controller, depending upon the particular application and implementation. The solenoid controller 17 may include control logic to control the AC signals and one or more switching devices (such as transistors) to selectively store and recover energy from one or more energy storage devices (such as capacitors) and/or to selectively provide a start-up control switch. Control logic which may be implemented in hardware, software, or a combination of hardware and software, then controls the corresponding strut actuator(s) to implement the solenoid control algorithm.

Transfer of Electrical Power

Figure 2:
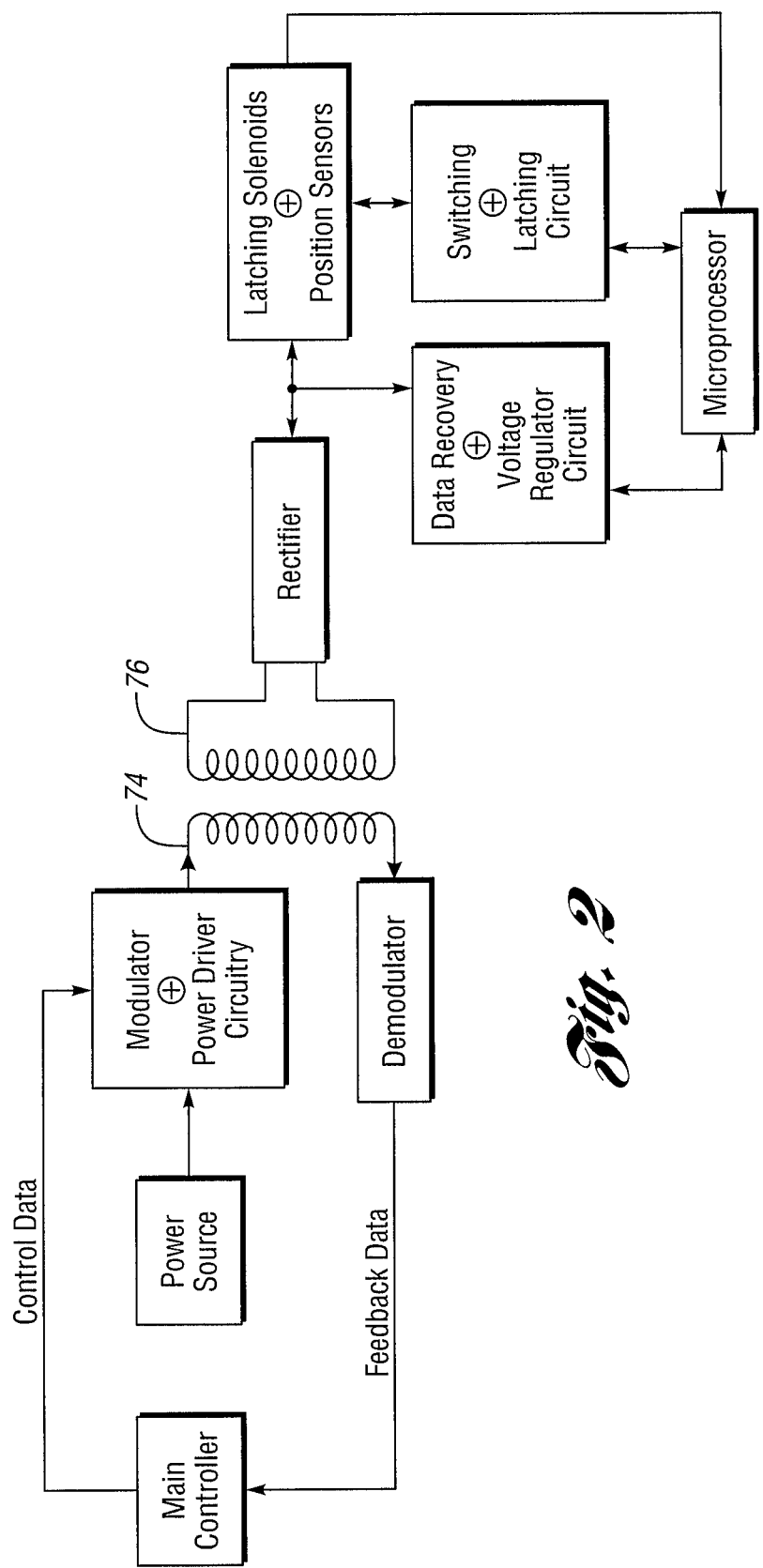
FIG. 2 is a block diagram of a one-way electrical power and two-way data communication apparatus of a control method and system constructed in accordance with at least one embodiment of the invention.

Referring now to FIG. 2, there is shown a one-way electrical power and two-way data communication apparatus of the preferred embodiment of this invention, coupled to a main controller and a source of electrical power. The apparatus is generally of the type described in U.S. Pat. No. 5,231,265. Specifically, the apparatus includes the inductors or coils 74 and 76, a modulator and power driver circuitry, a demodulator, a rectifier, latching solenoids and position sensors, a data recovery and voltage regulator circuit, a switching and latching circuit and a microprocessor. The modulator and power driver circuitry is coupled to the electrical power source and to the main controller. The modulator and power driver circuitry transfers the electrical power signal from the source to the inductor 74 which, in turn, transfers the electrical power signal to the inductor 76 by means of magnetic flux between the inductors 74 and 76. Thereafter, the inductor 76 couples the received electrical power signal to the rectifier. The rectifier is coupled to each of the latching solenoids 42 contained within each of the cavities 64 and acts to transfer this received electrical power to a latching solenoid 42 selected by the microprocessor. Additionally, the output of the rectifier is input into a voltage regulator which produces a DC output voltage at a level which is required by the microprocessor.

Upon receipt of the electrical power signal from the inductor 74, the inductor 76 outputs this electrical signal to the rectifier which rectifies the received AC electrical power signal to obtain a DC signal which is controllably coupled to each of latching solenoids disposed within each of the cavities 64. While this power is coupled to the individual latching solenoids, none of the electrical power flows therethrough due to the field effect transistors of the switching and latching current. That is, each of the individual latching solenoids 42 is coupled to a unique field effect transistor. The output of the rectifier is then applied and flows through its individual latching solenoid 42 only when its uniquely associated field effect transistor is enabled or is activated by the microprocessor. If the individual field effect transistor associated with a particular latching solenoid 42 is disabled, then the flow of electrical power to that individual latching solenoid 42 is blocked or prevented and, consequently, that latching solenoid 42 is not energized.

The microprocessor is coupled to each of the field effect transistors and to the position sensors 90 which sense the position of the struts 39. The position sensors 90 are deployed within the frame rail 66 so as to generate a signal representative of the position of the struts 39 actuated by each of the latching solenoids 42. The position signals are downloaded to the microprocessor, where they are stored by the microprocessor and later output therefrom.

Two-Way Data Communication

The modulator and power driver circuitry has an input which receives control data from the main controller. The electrical power signal received by the circuitry (from the power source) is modulated by the control data from the main controller. A tuned circuit in the circuitry has a resonant frequency. The resonant frequency provides an efficient transfer of electrical power to the latching solenoids from the electrical power source. When it is desired to transmit control data from the main controller 12 to the latching solenoids, the control data is transmitted to the circuitry. The circuitry causes a signal to be produced in the inductor 74 which comprises a variation or a modulation of the electrical power signal according to the control data. After such control data is sent, the circuitry then transfers electrical power to the inductor 76 (via the inductor 74) which is substantially un-altered or unmodulated. That is, the electrical power signal from the power source is initially varied according to the control data received from the main controller. In this manner, control data may be transmitted from the main controller to the microprocessor without the need for a physical connection therebetween or some sort of additional communication apparatus.

Not only is electrical power transferred to the individual latching solenoids in the form of pulses (for purposes of activating these solenoids), but the same electrical power signal is modified or varied according to control or feedback data which is desired to be sent to the microprocessor from the main controller. In this manner, the solenoids and the solenoid controller may be deployed in an inaccessible place (since no physical connections between the solenoid controller and main controller are necessary) making the solenoid controller much more adaptable to various situations while maintaining simplicity in overall design.

When an individual field effect transistor activates its associated latching solenoid a load is reflected to the inductor 74 by means of the flux communication between the inductor 76 and the inductor 74. By periodically activating and deactivating the field effect transistor, the programmed microprocessor causes a variation in the flux between the inductors 74 and

76. This flux occurs and/or exists because of the aforementioned transfer of electrical power between the inductors 74 and 76. This variation in the flux is used in the preferred embodiment of the invention, to send feedback data from the solenoid controller to the main controller via the demodulator. This feedback data is transmitted to the main controller by the selective activation and deactivation, of one of the field effect transistors by the microprocessor. In this manner feedback data such as strut position data may be transferred, from the position sensors 90 to the solenoid controller and then to the main controller, without the need for physical connection between the solenoid controller and the main controller.

Figure 4:
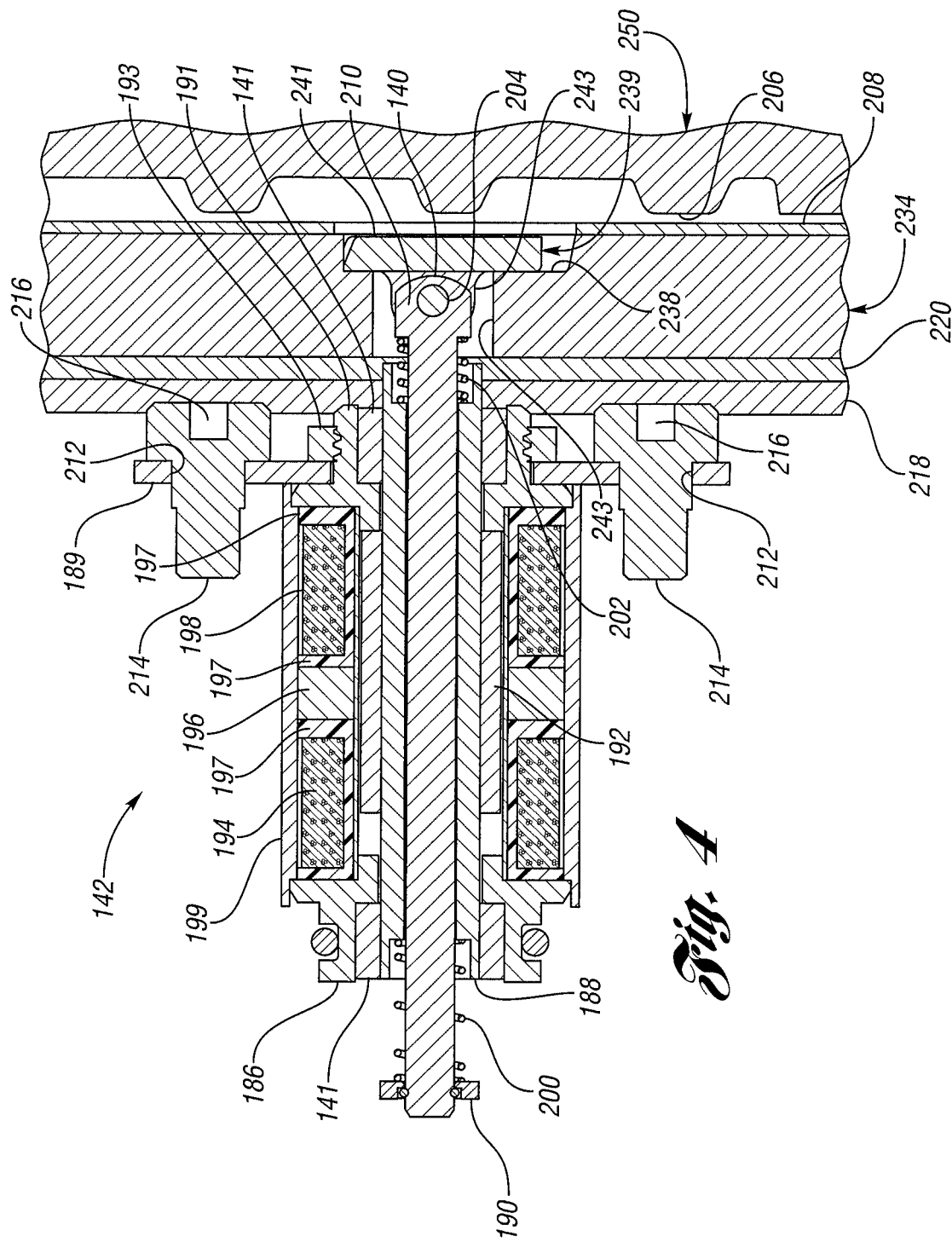
FIG. 4 is a sectional schematic view of a second embodiment of a latching solenoid "on-board" the clutch assembly of FIG. 1.

Referring now to FIG. 4, there is shown a second embodiment of a latching solenoid 142 for controlling a coupling or clutch assembly. The coupling or clutch assembly includes an annular notch plate or member 250 having at least one locking formation 206 formed thereon and an annular pocket member or plate, generally indicated at 234. An inner axially-extending surface of the plate 234 has internal splines for engagement with a torque transmitting element of a vehicular transmission. An inner, radially-extending face or surface of the plate 234 is formed with spaced reverse pockets 238 in which reverse struts 239 are received and retained to pivot therein about a pivot 204 which pivotally connects an end portion 210 of an actuator 140 to the strut 239. The opposite end portion of the actuator 140 is normally biased to the left by a coil spring 200 disposed between a ring 190 mounted on the actuator 140 and an end portion of a cylindrical member 188. An engaging portion of each reverse strut 239 is controlled by the actuator 140 which has the form of a domed plunger or push pin of a magnetically latching solenoid, generally indicated at 142. As indicated in FIG. 4, the latching solenoid 142 is mounted to an apertured plate 218 within the cavity 64 by a mounting flange 189 which is held on an end housing member 191 by a locking collar 193. Mounting members 214 extend through apertures 212 formed through the flange 189 and are secured to locking formations 216 on a surface of the plate 218. Another apertured plate 220 may be used to secure the plate 218 to the plate 234. A second end housing member 186 closes the opposite end of solenoid 142 and may include an O-ring for sealing purposes. The solenoid 142 also includes an exterior housing member 199.

The push pin or actuator 140 (which is shown in its fully extended position in FIG. 4) together with an armature 192 of the solenoid 142 reciprocate together within the solenoid 142 so that the pin 140 reciprocate within a passage 243 of the plate 234. The push pin 140 is supported for reciprocating motion by Teflon-coated inner surface of the cylindrical member 188. The locking ring 190 moves with the pin 140. The member 188 is supported at its opposite ends of the solenoid 142 by members 141. The armature 192 is positioned adjacent an upper coil assembly 194, a permanent magnet 196 and a lower coil assembly 198. The coil assemblies 194 and 198 include coils embedded within a suitable resin 197. Springs 200 and 202 bias the pin 140 between its extended and retracted positions. For example, the spring 200 is located between the ring 190 and one end of the member 188 and the spring 202 is located between the other end of the member 188 and the inner surface of the dome portion 210 of the pin 140.

The passage 243 communicates the cavity 64 of a frame rail, generally included at 66, in which the solenoid 142 is housed with the pocket 238 to actuate the end portion of its reverse strut 239 and overcome the bias of the spring 200.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An overrunning clutch and control assembly having first and second operating modes, the assembly comprising:

first and second clutch members supported for rotation relative to one another about a common rotational axis, the first and second clutch members having respective coupling faces that oppose each other;

the coupling face of one of the clutch members having a pocket;

the coupling face of the other clutch member having a locking formation;

a strut received within the pocket in the coupling face of the one clutch member and having an end that is pivotally movable outwardly of the pocket;

a biasing spring;

an electromechanical apparatus including a spring-loaded actuator mounted for controlled linear reciprocating motion and in communication with the pocket; and communication apparatus for wirelessly communicating electrical power from a source of electrical power to the electromechanical apparatus to cause the spring-loaded actuator to linearly move and pivot the strut end against the bias of the biasing spring and with the bias of the spring-loaded actuator from a first position which corresponds to the first operating mode to a second position which corresponds to the second operating mode.

2. The assembly as claimed in claim 1 wherein the coupling face of the one of the clutch members is oriented to face axially in a first direction along the rotational axis and the coupling face of the other clutch member is oriented to face axially in a second direction along the rotational axis.

3. The assembly as claimed in claim 1 wherein the electromechanical apparatus includes a latching solenoid.

4. The assembly as claimed in claim 1 wherein the first position is an overrun position, the first operating mode is an overrun mode, the second position is a locked position and the second operating mode is a locked mode.

5. The assembly as claimed in claim 1 wherein the biasing spring biases the strut against pivotal movement of the end out of the pocket toward the locking formation of the coupling face of the other clutch member.

6. The assembly as claimed in claim 1 wherein the biasing spring biases the actuator against linear movement towards the locking formation.

7. The assembly as claimed in claim 6 wherein the strut is pivotally connected to the actuator.

8. The assembly as claimed in claim 1 further comprising a sensor for sensing the position of the strut end and providing corresponding feedback information.

9. An overrunning clutch and control assembly having first and second operating modes, the assembly comprising:

first and second clutch members supported for rotation relative to one another about a common rotational axis, the first and second clutch members having respective coupling faces that oppose each other;

the coupling face of one of the clutch members having first and second pockets;

the coupling face of the other clutch member having at least one locking formation;

a first strut received within the first pocket and a second strut received within the second pocket in the coupling face of the one clutch member, each of the struts having an end that is pivotally movable outward of its respective pocket;

a first biasing spring and a second biasing spring;

first and second electromechanical apparatus, the first electromechanical apparatus including a spring-loaded first actuator mounted for controlled linear reciprocating motion and in communication with the first pocket, the second electromechanical apparatus including a spring-loaded second actuator mounted for controlled linear reciprocating motion and in communication with the second pocket;

control logic to control the first and second electromechanical apparatus in accordance with a control algorithm; and communication apparatus for wirelessly communicating electrical power from a source of electrical power to one of the first and second electromechanical apparatus selected by the control logic to cause the spring-loaded actuator of the selected electromechanical apparatus to linearly move and pivot a corresponding strut end against the bias of the corresponding biasing spring and with the bias of the spring-loaded actuator of the selected electromechanical apparatus from a first position which corresponds to the first operating mode to a second position which corresponds to the second operating mode.

10. The assembly as claimed in claim 9 wherein the coupling face of the one of the clutch members is oriented to face axially in a first direction along the rotational axis and the coupling face of the other clutch member is oriented to face axially in a second direction along the rotational axis.

11. The assembly as claimed in claim 9 wherein the corresponding biasing spring biases the pivoted strut against pivotal movement of its end out of its pocket toward the locking formation of the coupling face of the other clutch member.

12. The assembly as claimed in claim 9 wherein the actuator of the selected electromechanical apparatus is biased by the corresponding biasing spring against linear movement towards the locking formation.

13. The assembly as claimed in claim 12 wherein the actuator of the selected electromechanical apparatus is pivotally connected to its respective strut.

14. The assembly as claimed in claim 9 wherein each of the electromechanical apparatus includes a latching solenoid.

15. The assembly as claimed in claim 9 wherein the first position is an overrun position, the first operating mode is an overrun mode, the second position is a locked position and the second operating mode is a locked mode.

16. The assembly as claimed in claim 9 further comprising a first sensor for sensing the position of the first strut end and providing corresponding feedback information and a second sensor for sensing the position of second strut end and providing corresponding feedback information for controlling the first and second electromechanical apparatus, respectively.

17. A coupling and control assembly having first and second operating modes, the assembly comprising:

a first coupling member having a pocket;

a second coupling member having a locking formation;

an engaging member received in the pocket, the engaging member being engageable with the locking formation;

an electromechanical apparatus including a spring-loaded actuator mounted for controlled linear reciprocating motion and in communication with the pocket; and communication apparatus for wirelessly communicating electrical power from a source of electrical power to the electromechanical apparatus to cause the spring-loaded actuator to linearly move and move the engaging member from a first position which corresponds to the first operating mode to a second position which corresponds to the second operating mode.

18. The assembly as claimed in claim 17 wherein the coupling face of the one of the clutch members is oriented to face axially in a first direction along an axis and the coupling face of the other clutch member is oriented to face axially in a second direction along the axis.

19. The assembly as claimed in claim 17 wherein the electromechanical apparatus includes a latching solenoid.

20. The assembly as claimed in claim 17 wherein the engaging member is pivotally connected to the actuator.

21. The assembly as claimed in claim 17 wherein the first position is an overrun position, the first operating mode is an overrun mode, the second position is a locked position and the second operating mode is a locked mode.

22. The assembly as claimed in claim 17 further comprising a sensor for sensing the position of the engaging member and providing corresponding feedback information.

23. A coupling and control assembly having first and second operating modes, the assembly comprising:

a first coupling member having first and second pockets;

a second coupling member having at least one locking formation;

a first engaging member received in the first pocket and a second engaging member received within the second pocket, the engaging members being engageable with the at least one locking formation;

first and second electromechanical apparatus, the first electromechanical apparatus including a spring-loaded first actuator mounted for controlled linear reciprocating motion and in communication with the first pocket, the second electromechanical apparatus including a spring-loaded second actuator mounted for controlled linear reciprocating motion and in communication with the second pocket;

control logic to control the first and second electromechanical apparatus in accordance with a control algorithm; and communication apparatus for wirelessly communicating electrical power from a source of electrical power to one of first and second electromechanical apparatus selected by the control logic to cause the spring-loaded actuator of the selected electromechanical apparatus to linearly move and move a corresponding engaging member from a first position which corresponds to the first operating mode to a second position which corresponds to the second operating mode.

24. The assembly as claimed in claim 23 wherein the coupling face of the one of the clutch members is oriented to face axially in a first direction along an axis and the coupling face of the other clutch member is oriented to face axially in a second direction along the axis.

25. The assembly as claimed in claim 23 wherein each of the electromechanical apparatus includes a latching solenoid.

26. The assembly as claimed in claim 23 wherein the actuator of the selected electromechanical apparatus is pivotally connected to its respective engaging member.

27. The assembly as claimed in claim 23 wherein the first position is an overrun position, the first operating mode is an overrun mode, the second position is a locked position and the second operating mode is a locked mode.

28. The assembly as claimed in claim 23 further comprising a first sensor for sensing the position of the first engaging member and providing feedback information and a second sensor for sensing the position of the second engaging member and providing feedback information for controlling the first and second electromechanical apparatus, respectively.

29. A clutch and control assembly having first and second operating modes, the assembly comprising:

first and second clutch members that are rotatably supported for rotation relative to one another about a common rotational axis, the first and second clutch members having respective coupling faces that oppose each other;

the coupling face of one of the clutch members having a pocket;

the coupling face of the other clutch member having a locking formation;

a strut received within the pocket of the coupling face of the one clutch member and having an engaging portion that is movable away from the pocket;

an electromechanical apparatus including a spring-loaded actuator mounted for controlled linear reciprocating motion and in communication with the pocket; and communication apparatus for wirelessly communicating electrical power from a source of electrical power to the electromechanical apparatus to cause the spring-loaded actuator to linearly move and move the engaging portion of the strut from a first position which corresponds to the first operating mode to a second position which corresponds to the second operating mode.

30. The assembly as claimed in claim 29 wherein the coupling face of the one of the clutch members is oriented to face axially in a first direction along the rotational axis and the coupling face of the other clutch member is oriented to face axially in a second direction along the rotational axis.

31. The assembly as claimed in claim 29 wherein the electromechanical apparatus includes a latching solenoid.

32. The assembly as claimed in claim 29 wherein the strut is pivotally connected to the actuator.

33. The assembly as claimed in claim 29 wherein the first position is an overrun position, the first operating mode is an overrun mode, the second position is a locked position and the second operating mode is a locked mode.

34. The assembly as claimed in claim 29 further comprising a sensor for sensing the position of the engaging portion of the strut and providing corresponding feedback information.

35. A clutch and control assembly having first and second operating modes, the assembly comprising:

first and second clutch members that are rotatably supported for rotation relative to one another about a common rotational axis, the first and second clutch members having respective coupling faces that oppose each other;

the coupling face of one of the clutch members having forward and reverse pockets;

the coupling face of the other clutch member having at least one locking formation;

a forward strut received within the forward pocket and a reverse strut received within the reverse pocket of the coupling face of the one clutch member, each of the struts having an engaging portion that is movable away from its respective pocket;

forward and reverse electromechanical, the forward electromechanical apparatus including a forward spring-loaded actuator mounted for controlled linear reciprocating motion and in communication with the forward pocket, the reverse electromechanical apparatus including a reverse spring-loaded actuator mounted for controlled linear reciprocating motion and in communication with the reverse pocket;

control logic to control the forward and reverse electromechanical apparatus in accordance with a control algorithm; and communication apparatus for wirelessly communicating electrical power from a source of electrical power to one of the forward and reverse electromechanical apparatus selected by the control logic to cause the spring-loaded actuator of the selected electromechanical apparatus to linearly move and move a corresponding engaging portion from a first position which corresponds to the first operating mode to a second position which corresponds to the second operating mode.

36. The assembly as claimed in claim 35 wherein the coupling face of the one of the clutch members is oriented to face axially in a first direction along the rotational axis and the coupling face of the other clutch member is oriented to face axially in a second direction along the rotational axis.

37. The assembly as claimed in claim 35 wherein the actuator of the selected electromechanical apparatus is pivotally connected to its respective strut.

38. The assembly as claimed in claim 35 wherein each of the electromechanical apparatus includes a latching solenoid.

39. The assembly as claimed in claim 35 wherein the first position is an overrun position, the first operating mode is an overrun mode, the second position is a locked position and the second operating mode is a locked mode.

40. The assembly as claimed in claim 35 further comprising a forward sensor for sensing the position of the engaging portion of the forward strut and providing corresponding feedback information and a reverse sensor for sensing the position of the engaging portion of the reverse strut and providing corresponding feedback information for controlling the forward and reverse electromechanical apparatus, respectively.

* * * * *